(12) United States Patent
Masuda et al.

(10) Patent No.: US 6,661,555 B2
(45) Date of Patent: Dec. 9, 2003

(54) LIGHT SHUTTER DEVICE

(75) Inventors: Tomohiko Masuda, Otsu (JP); Ken Matsubara, Takatsuki (JP); Isao Doi, Toyonaka (JP); Yasuyuki Hiromoto, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/166,393

(22) Filed: Jun. 11, 2002

(65) Prior Publication Data

US 2002/0186446 A1 Dec. 12, 2002

(30) Foreign Application Priority Data

Jun. 12, 2001 (JP) ............................. 2001-177813

(51) Int. Cl.[7] ............................. G02F 1/07; G02F 1/00
(52) U.S. Cl. ..................... 359/245; 359/254; 359/320; 396/457
(58) Field of Search ................... 359/245, 251, 359/252, 254, 255, 256, 319, 320; 396/249, 262, 452, 457, 506

(56) References Cited

U.S. PATENT DOCUMENTS

| 5,450,230 A | 9/1995 | Masuda et al. ............. 359/254 |
| 6,347,894 B1 * | 2/2002 | Yagi et al. ................. 396/457 |
| 6,441,941 B2 * | 8/2002 | Doi et al. .................. 359/245 |

* cited by examiner

*Primary Examiner*—Georgia Epps
*Assistant Examiner*—M. Hasan
(74) *Attorney, Agent, or Firm*—McDermott, Will & Emery (57) ABSTRACT

A light shutter device including a group of light shutter elements 31a, 31b 31c and 31d formed on a light shutter chip 30 made of PLZT has a construction in which an electrode gap is set wider in a element in which an electric field acts more strongly to equalize half wavelength voltages of elements almost to the same level since electric fields acting on the elements are different in strength from each other even under a prescribed voltage applied between a common electrode 32 and each of individual electrodes 33. An electrode gap of an element 31c having a weaker electric field is comparatively set narrower, whereas an electrode gap of an element 31d having a stronger electric field is set comparatively wider. Moreover, a shape of electrodes of each element are altered so as to make half wavelength voltages of elements almost equal.

20 Claims, 6 Drawing Sheets

PRIOR ART

LIGHT SHUTTER DEVICE

This application is based on application No. JP 2001-177813 filed in Japan, the contents of which are hereby incorporated by reference.

BACKGROUND OF THE INVENTION

1. Field of the Invention

The present invention relates to an improved light shutter device. More particularly, the present invention relates to a light shutter device including plural electrodes in an opposite structure provided on a substrate made of a material having an electro-optical effect and light modulation regions each sandwiched between electrodes.

2. Description of the Related Art

Heretofore, there have been used light shutter devices, each having plural light modulation regions provided on a substrate made of PLZT or LiNbO$_3$, which are materials having an electro-optical effect, each including the substrates arranged in array, and on/off controlling light, in an external light modulator for use in large capacity optical communication, an optical path change-over switch in an optical time domain reflectometer or an optical signal generator for an optical printer.

Figure 5:
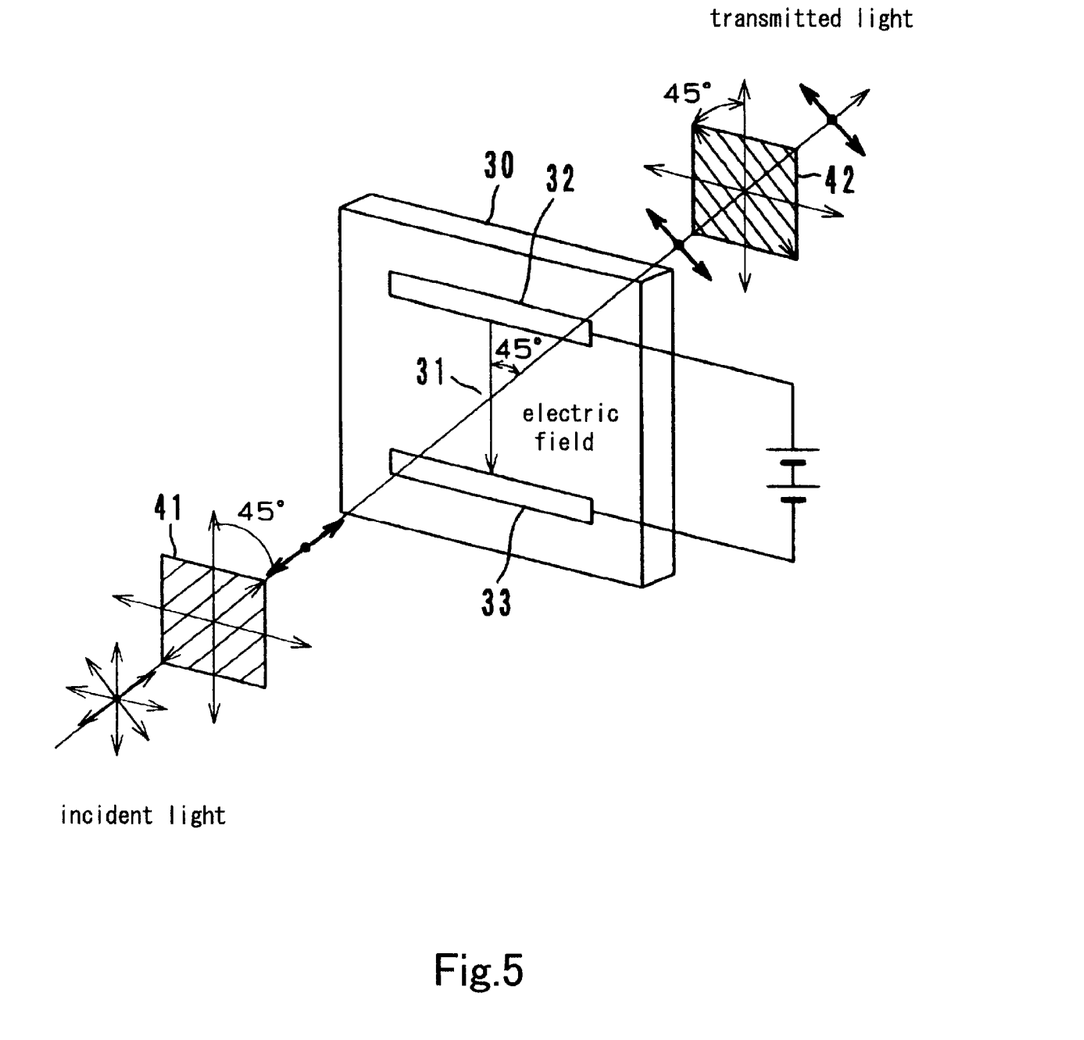
FIG. 5 is an illustration showing an operational principle of a light shutter device.

To be detailed, as shown in FIG. 5, a voltage is applied between electrodes 32 and 33 of one pair provided on a PLZT substrate (a light shutter chip) 30 to thereby generate an electric field, to produce a birefringence in PLZT, to convert light incident on a light shutter element (a light modulation region) 31, the light being transmitted through a polarizer 41 installed at the previous stage thereof, to 90 degree polarized light and to finally cause outgoing light to be transmitted through an analyzer 42. On the other hand, in a case where no electric field is generated, light transmitted through the polarizer 41 is transmitted through the light shutter element 31 without being polarized, but intercepted by the analyzer 42.

In such a light shutter element 31, the maximum quantity of transmitted light can be obtained when incident light is converted to 90 degree polarized light, and an applied voltage at this time is called a half wavelength voltage.

Figure 6:
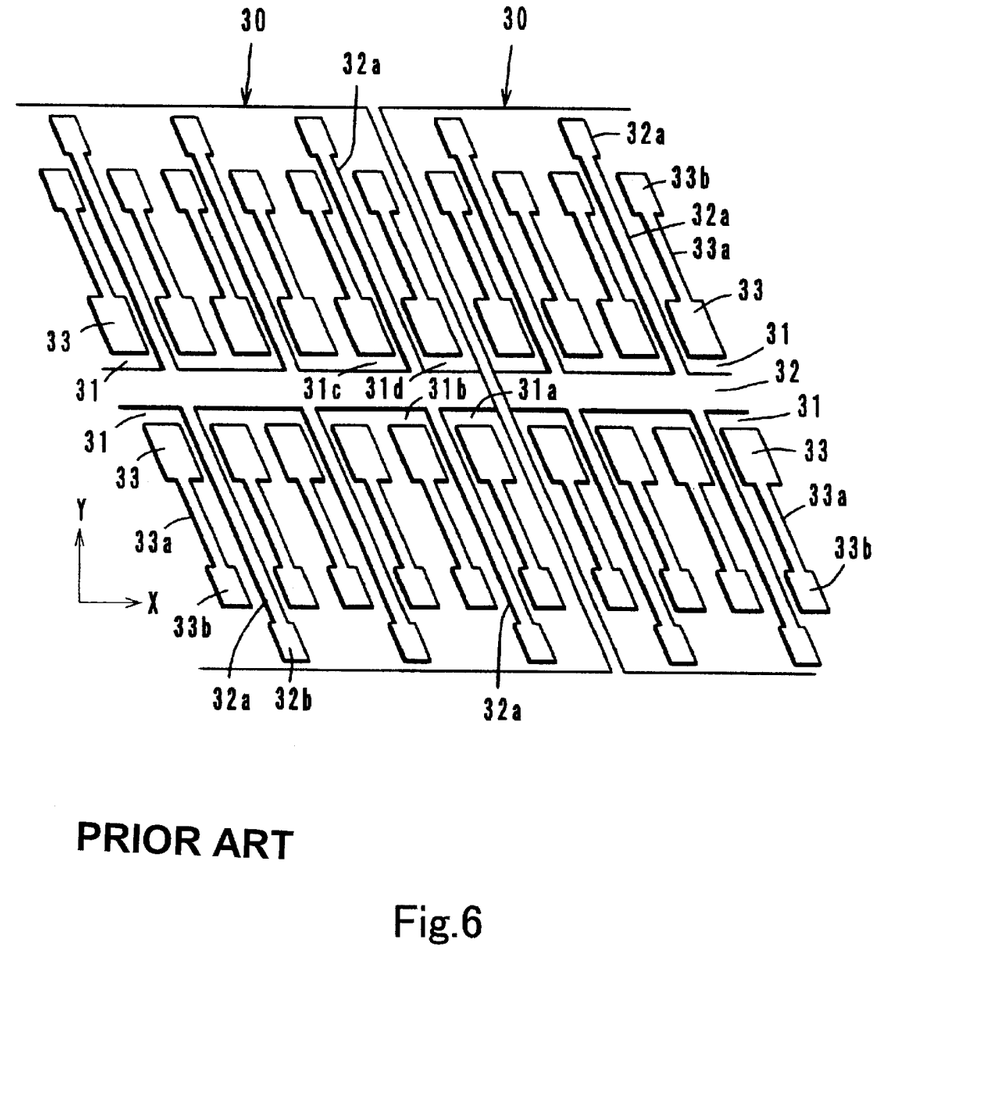
FIG. 6 is a plan view showing an electrode pattern in a prior art light shutter device.

In FIG. 6, there is shown an electrode pattern formed on a chip 30 adopted in a prior art light shutter device. On the chip 30, there are formed a common electrode 32 grounded and individual electrodes 33 opposite it and light shutter elements 31 are formed between the electrodes 32 and 33. The individual electrodes 33 are connected to bonding pads 33b through respective lead electrodes 33a, while the common electrode 32 is also connected to bonding pads 32b through respective lead electrodes 32a.

In a case where this kind of a light shutter device is used in forming an image, a requirement arises for thousands of light shutter elements 31 in exposure across a length of the order of 30 cm in the main scan direction indicated by an arrow mark X. This requirement is difficult to realize with one chip 30 but instead, an array architecture is adopted in which chips 30 on each of which hundreds of elements 31 are formed are juxtaposed in parallel with each other along the arrow mark X direction. Moreover, the light shutter elements 31 are arranged in a double rowed, zigzag pattern and on/off controlled at prescribed timings in each row, thereby forming an image of one line on an exposed surface moving in the sub-scan direction indicated by an arrow mark Y.

Attention being focused on a group of light shutter elements 31a, 31b, 31c and 31d, variations in half wavelength voltage arise among the elements because of differences in position of the elements and shapes of electrodes around an element on a chip. That is, since the elements 31a and 31d are located at an end of a chip 30, electric fields applied by the electrodes 32 and 33 tend to be confined, thereby strongly acting on the elements 31a and 31d as compared with electric fields of other elements 31b and 31c and so on. On the other hand, in comparison between the elements 31b and 31c, an electric field of an element is different according to whether a lead electrode 32a is located on the acute angle side or the obtuse angle side of an individual electrode 33. A lead electrode 32a adjacent to the element 31c is located on the acute angle side of an individual electrode 33; therefore, an electric field applied between the electrodes 32 and 33 leaks into the lead electrode 32a more than in the case of the element 31b located on the obtuse angle side of an individual electrode 33, thereby weakening the electric field in the element 31c as compared with an electric field in the elements 31b. An influence of a lead electrode 32a is equally exerted on the elements 31a and 31b.

Figure 7:
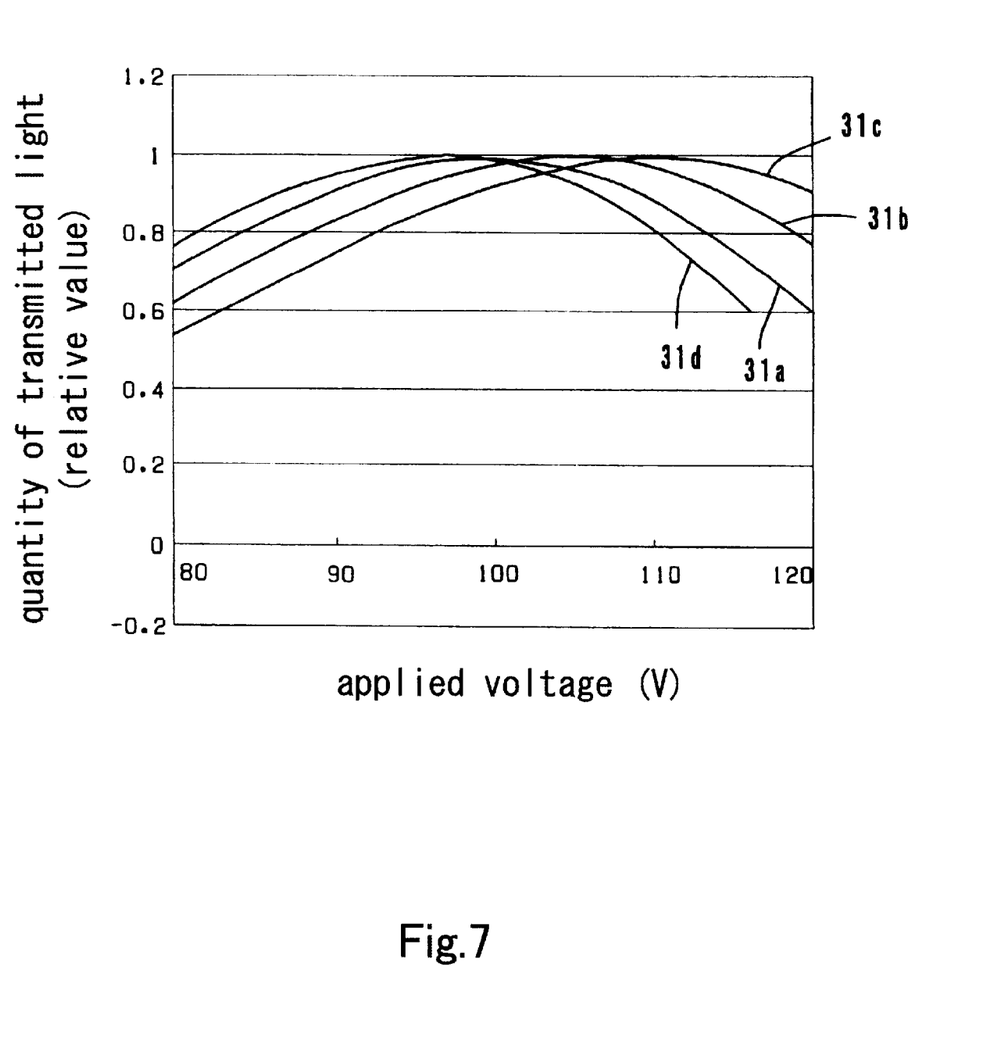
FIG. 7 is a graph showing a characteristic of a quantity of transmitted light versus an applied voltage to a light shutter element in a prior art light shutter device.

In FIG. 7, there are shown relationships of a quantity of transmitted light versus an applied voltage of the respective light shutter elements 31a, 31b, 31c and 31d. Since each of the elements is driven by a prescribed voltage, variations in half wavelength voltage, as shown in the figure, result in differences in transmitted quantity, leading to variations in light quantity. For example, if a light shutter device is employed in recording of an image, uneven transmitted quantity is observed as unevenness in image density, resulting in degradation of an image quality.

OBJECTS AND SUMMARY

The present invention has been made in light of such circumstances and it is an object of the present invention to provide an improved light shutter device. That is, the object is to provide an improved light shutter including plural electrodes in an opposite structure provided on a substrate made of a material having an electro-optical effect and light modulation regions each sandwiched between electrodes. More particularly, it is an object of the present invention to provide a light shutter device capable of suppressing variations in quantity of transmitted light among light modulation regions regardless of differences in position of a light modulator element and pattern of electrodes around of a light modulator element on a substrate.

In order to achieve the object and other objects, a light shutter in an aspect of the present invention includes: a substrate made of a material having an electro-optical effect; and plural electrodes in an opposite structure provided on the substrate, wherein a region between electrodes of each pair on the substrate becomes a light modulation region and thereby the region serves as a light shutter, and a spacing between and/or a shape of electrodes in an opposite structure is made different according to an environment in which the light modulation region is placed, thereby almost equalizing half wavelength voltages of light modulation regions.

With such a construction adopted, variations in quantity of transmitted light among light modulation regions can be suppressed.

In another aspect, the environment is a position on the substrate of the light modulation region.

In still another aspect, the environment is a pattern of electrodes located around of the light modulation region.

In yet another aspect, the spacing between electrodes of a pair forming a light modulation region is narrower in an environment thereof having an electric field weaker in action, while being wider in an environment thereof having an electric field stronger in action.

In a further aspect, a wider spacing is set between electrodes of a pair forming a light modulation region located at an end of the substrate.

In a still further aspect, that the shape of electrodes is made different means that an areas of an electrode is made different.

In a yet further aspect, an electrode area of an electrode forming a light modulation region located at an end of the substrate is narrowed.

In another aspect, the light modulation regions are arranged zigzagging in 4 rows and a spacing between electrodes of a pair forming a light modulation region in the inner side of the 4 rows is narrower than in the outer side thereof.

A light shutter device instill another aspect includes a shielding layer having a window defining an aperture through which light is transmitted for each light modulation region, and.

In yet another aspect, a window of the shielding layer defines the aperture with a light modulation region formed between electrodes in an opposite structure having the smallest spacing therebetween as a criterion.

With such a construction, for example, in a case where a light shutter device is used in recording an image, sizes of pixels can be made uniform by windows.

Moreover, a light shutter device in a further aspect includes: a substrate made of a material having an electro-optical effect; and plural electrodes in an opposite structure provided on the substrate, wherein a region between electrodes of each pair on the substrate becomes a light modulation region and thereby the region serves as a light shutter, and at least one factor of a spacing between and a shape of electrodes in an opposite structure sandwiching each light modulation region is made different, thereby almost equalizing half wavelength voltages of light modulation regions.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

Figure 1:
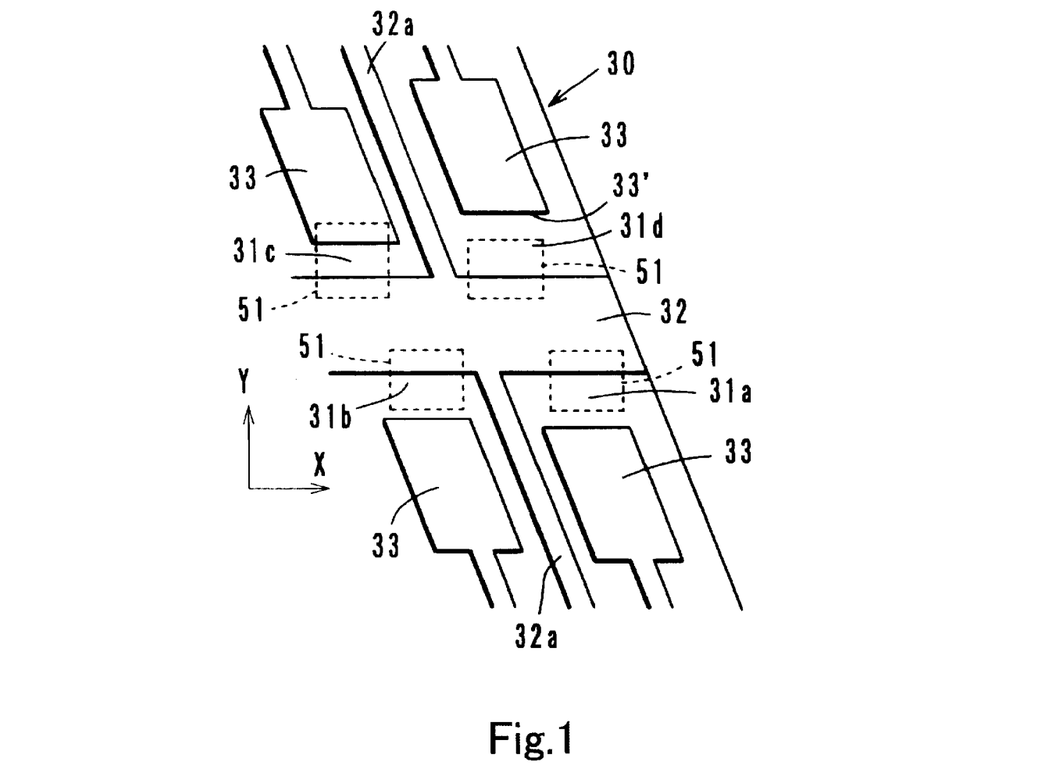
FIG. 1 is a plan view showing a main part of a first embodiment of a light shutter device relating to the present invention.

Description will be given of embodiments of a light shutter device relating to the present invention below with reference to the accompanying drawings:

FIRST EMBODIMENT WITH REFERENCE TO FIG. 1

In FIG. 1, there is shown a main part of a first embodiment of a light shutter device relating to the present invention. A common electrode 32 and individual electrodes 33 are formed on a light shutter chip 30 made of PLZT and the light shutter device is similar to a prior art light shutter device shown in FIG. 6 in that regions between the electrodes 32 and 33 in an opposite structure become light modulation regions (light shutter elements) 31. Accordingly, the same symbols are attached to the same members and parts in FIGS. 1 and 6, and descriptions thereof are omitted.

A feature in the first embodiment is that electrode gaps of light shutter elements 31a, 31b, 31c and 31d are different from each other. In the light shutter elements, as described in FIG. 6, a strength of an electric field increases or decreases according to a position of a light shutter element on a chip 30 (whether or not a light shutter element is located at an end of the chip 30) and a shape of an electrode located around a light shutter element even under the same drive voltage applied, resulting in variations in quantity of transmitted light among the light shutter elements. Since the variations have respective characteristics as shown in FIG. 7, electrode gaps of the elements 31a, 31b, 31c and 31d are caused to differ from each other in width to adjust the gaps such that half wavelength voltages are almost equal to each other.

That is, a gap of the element 31c having the weakest action of an electric field is set to the narrowest and the other gaps are set so as to be increasingly wider in the order of elements 31b, 31a and 31d. As a technique to set an electrode gap different in width, a position itself at which an individual electrode 33 is formed is shifted in the first embodiment. Only a distal end 33' of an individual electrode 33 may also be displaced while maintaining a position of formation of the individual electrode 33 as is. On the other hand, an electrode gap can also be altered by changing a shape of the common electrode 32.

Figure 2:
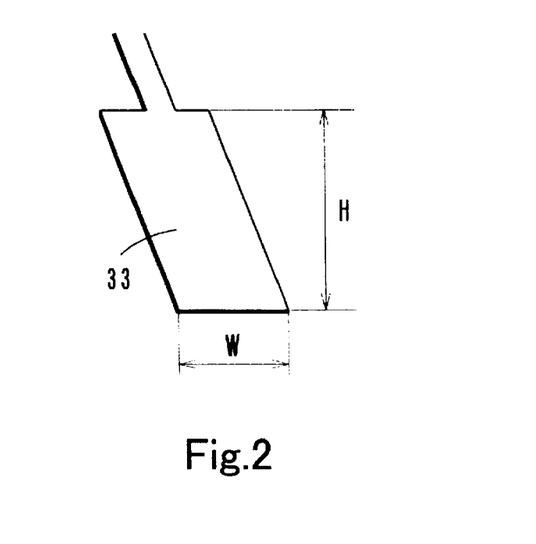
FIG. 2 is a plan view showing an example modification of the first embodiment.
Figure 3:
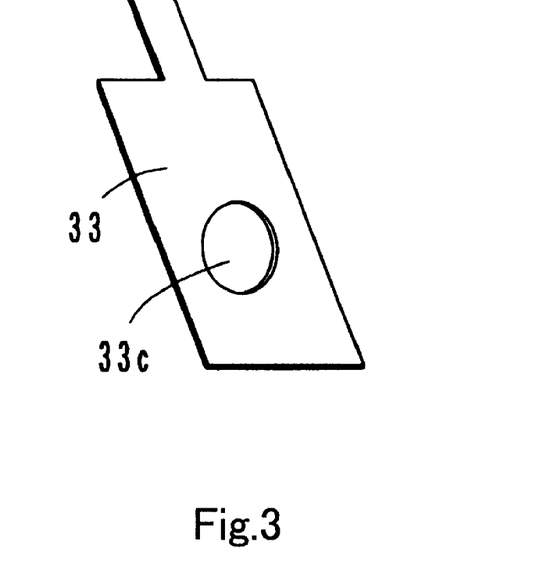
FIG. 3 is a plan view showing another example modification of the first embodiment.

In order to equalize half wavelength voltages of light shutter elements, an area of an individual electrode 33 may also be altered instead of alteration in electrode gap. That is, as shown in FIG. 2, an electrode may also be altered in height H and electrode width W. Moreover, as shown in FIG. 3, a hole 33c for area adjustment may also be formed in an individual electrode 33. Alternatively, an electrode 33 may also be partly cut away. On the other hand, an opposing front of the common electrode 32 is varied in shape to adjust an acting strength of an electric field on a light shutter element and to eventually enable a half wavelength voltage to be equal to other half wavelength voltages as well.

If an area of the electrode 32 or an electrode 33 is reduced, an electric field is hard to be applied to a corresponding element, leading to a higher halfwave length voltage. Therefore, a height H and/or width W of an individual electrode 33 is decreased or a hole 33c is formed therein if a corresponding light shutter element 31d has a comparatively strong action of an electric field, thereby adjusting a half wavelength voltage to be higher.

In a light shutter device of this kind, since an electric field is applied even to a region other than light shutter elements to cause light to be transmitted through a chip, a shielding layer having a window defining an aperture through which light is transmitted for each of the shutter elements is provided on a chip. A shielding layer is made of a material absorbing or reflecting light.

Figure 8:
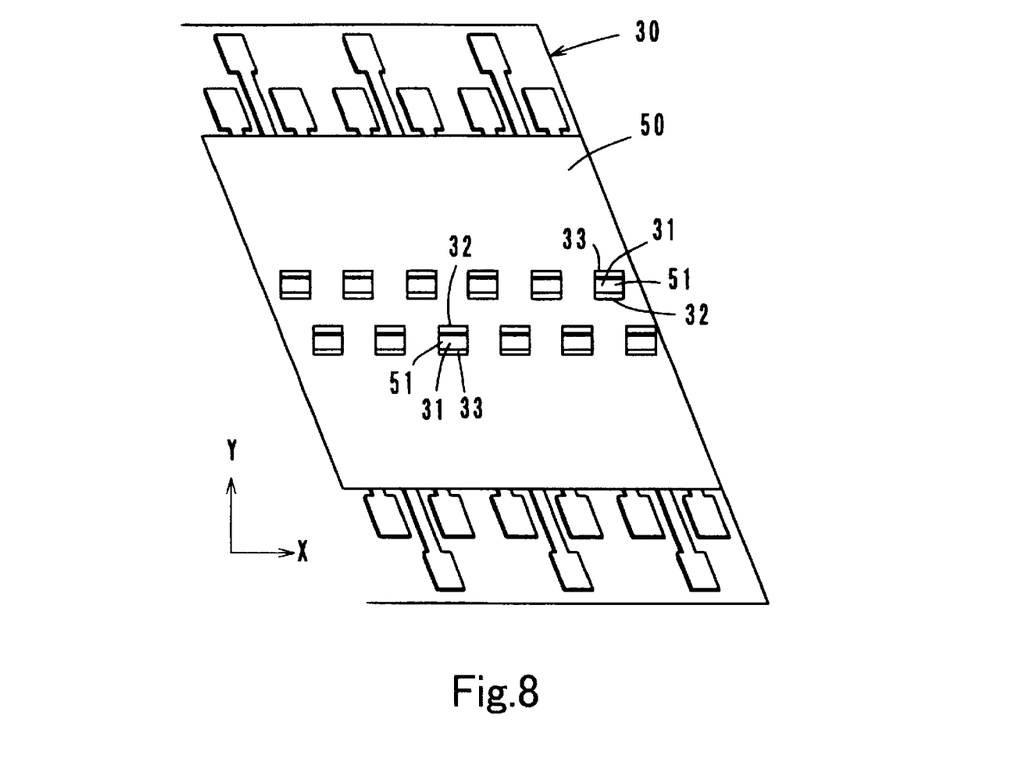
FIG. 8 is a plan view showing a first example shielding layer provided in a prior art light shutter device.
Figure 9:
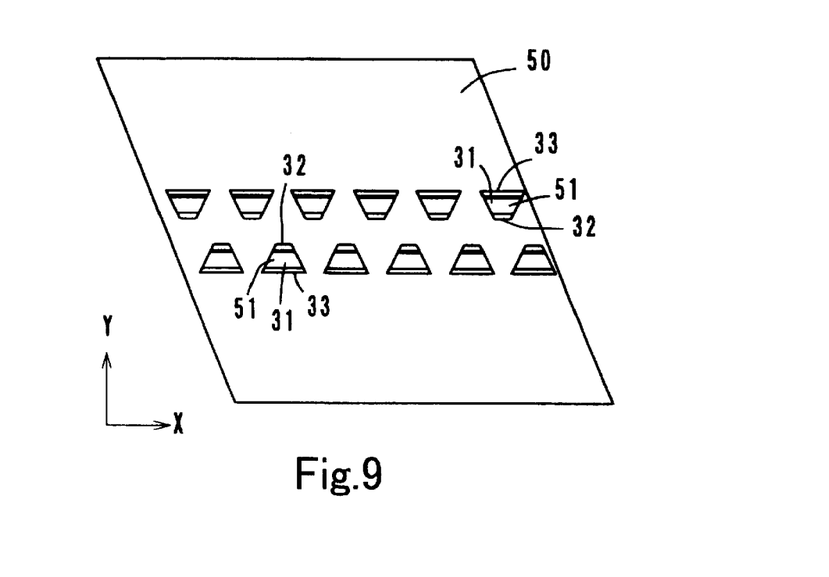
FIG. 9 is a plan view showing a second example shielding layer provided in a prior art light shutter device.

FIGS. 8 and 9 shows a shielding layer 50 provided in a prior art light shutter device. The light shielding layer 50 shown in FIG. 8 has a window 51 of a rectangular shape and the light shielding layer 50 shown in FIG. 9 has a window 51 of a trapezoidal shape. In a case where an image is formed, by inclining an oblique side of the trapezoidal shape greatly to the Y direction (the sub-scan direction), improvement is achieved on continuity of pixels in the X direction (the main scan direction) on an exposed surface.

In a usual case, the window 51 is set wider in the Y direction than a gap between the electrodes 32 and 33, and a dimension of the aperture in the Y direction is defined by the electrodes 32 and 33. This is because even though an electrode gap is set narrower in order to reduce a half wavelength voltage, an aperture area is not set smaller than necessary. A width of the window 51 in the X direction is set narrower than that of the electrodes 32 and 33 in the X direction so as to apply a uniform electric field in the window 51.

In the first embodiment, as described above, an electrode gap is individually different according to an light shutter element; therefore, in a case where a shield layer is provided, if an aperture is defined by the electrodes 32 and 33 with a window in dimension larger in the Y direction as in a prior practice, a dimension of the aperture in the Y direction is different according to a difference in electrode gap.

Therefore, in the first embodiment, as shown in FIG. 1, a dimension of an aperture in the Y direction of the light shutter element 31c having the narrowest electrode gap is defined by a gap of the electrodes 32 and 33, and as for the light shutter elements 31a, 31b and 31d having a gap wider than the narrowest gap of the light shutter element 31c, a dimension of an aperture of a light shutter element in the Y direction is defined by a window 51 of the shielding layer. That is, a dimension of a window 51 of the shielding layer corresponding to each element is set so as to attain an aperture of the same dimension in the Y direction as the element 31c having the narrowest electrode gap as a criterion. By doing so, sizes of pixels on an exposed surface illuminated with light transmitted through respective elements can be made the same as each other.

Figure 4:
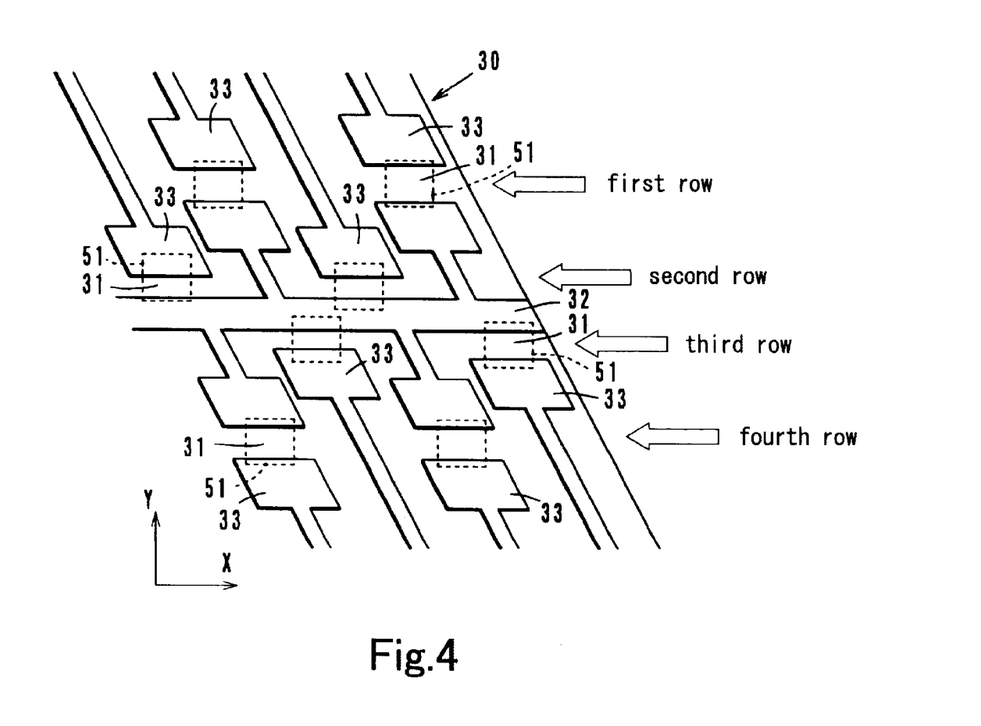
FIG. 4 is a plan view showing a main part of a second embodiment of a light shutter device relating to the present invention.

SECOND EMBODIMENT WITH REFERENCE TO FIG. 4

If light shutter elements are constructed with electrodes provided on a substrate made of a material having an electro-optical effect, a problem of a cross talk phenomenon arises that an electric field from electrodes provided to one element also acts on an element in the proximity of the one element to affect a quantity of transmitted light. In order to reduce cross talk, a method has been known, in which as shown in FIG. 6, lead electrodes 32a at a ground potential are inserted between light shutter elements and in addition to this, another method has also been effective in which adjacent light shutter elements are installed farther away from each other.

In the second embodiment, as shown in FIG. 4, light shutter elements 31 are arranged zigzagging in 4 rows on a light shutter chip 30 so as to reduce cross talk between adjacent elements. Light shutter elements 31 are on/off controlled in each row thereof as a unit to form an image of one line on an exposed surface moving at a constant speed in the sub-scan direction Y.

In the light shutter elements 31 in a 4 row arrangement, elements on the first and fourth rows have absolutely the same pattern of electrodes around each element as each other, and show the same characteristic as an action of an electric field as each other, except for elements located at both ends of the chip 30, to which are separately given consideration and this also applies to elements on the second and third rows. In comparison of elements on the first row with elements on the second row, and of elements on the third row with elements on the fourth row, that is, in comparison of elements on the outer row with elements on the inner row, the elements on the outer row and the elements in the inner row are different in electrode pattern around an element from each other with respect to the common electrode 32. In the elements 31 on the inner row (the second row or the third row), an individual electrode 33 is surrounded by common electrodes 32 on the outer row (the first row or the fourth row), an electric field to be applied to the common electrode on the inner row from the individual electrodes is leaked into the common electrode on the outer row, with the result of limitation on action of an electric field as compared with the case of the elements 31 on the outer row, leading to a tendency to increase in half wavelength voltage of the elements on the inner row.

Therefore, in the second embodiment, an electrode gap of each element 31 on the inner rows is set narrower than that on the outer rows. Alternatively, an electrode gap of each element 31 on the outer rows is set wider than that on the inner rows. Even in a case of 4 row arrangement, as described in the first embodiment, in elements at both ends of the chip 30, an electric field tends to act strongly; therefore, an electrode gap are set wider in order to equalize a half wavelength voltage of each element with elements other than those at the ends.

Note that in the second embodiment as well, as a method to make half wavelength voltages uniform, a shape of each electrode may also be modified as shown in FIGS. 2 and 3.

OTHER EMBODIMENTS

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

For example, arbitrarily selected are a detailed construction of a light shutter chip, a shape of a common electrode and a way mounting a chip, together with a drive circuit and others, on a substrate. Moreover, various kinds of materials having an electro-optical effect can be employed in addition to the PLZT.

What is claimed is:

1. A light shutter apparatus comprising:
 a substrate made of a material having an electro-optical effect, and
 a plurality of electrodes in an opposite structure provided on the substrate,
 wherein a region between electrodes of each pair on the substrate becomes a light modulation region and thereby the region serves as a light shutter, and a spacing between and/or a shape of electrodes in an opposite structure is made different according to an environment in which the light modulation region is placed, thereby almost equalizing half wavelength voltages of light modulation regions.

2. A light shutter apparatus according to claim 1, wherein the environment is a position on the substrate of the light modulation region.

3. A light shutter apparatus according to claim 1, wherein the environment is a pattern of electrodes located around of the light modulation region.

4. A light shutter apparatus according to claim 1, wherein the spacing between electrodes of a pair forming a light modulation region is narrower in an environment thereof having an electric field weaker in action, while being wider in an environment thereof having an electric field stronger in action.

5. A light shutter apparatus according to claim 1, wherein a wider spacing is set between electrodes of a pair forming a light modulation region located at an end of the substrate.

6. A light shutter apparatus according to claim 1, wherein an area of an electrode is made different according to the environment in which the light modulation region is placed.

7. A light shutter apparatus according to claim 1, wherein an electrode area of an electrode forming a light modulation region located at an end of the substrate is narrowed.

8. A light shutter apparatus according to claim 1, wherein the light modulation regions are arranged zigzagging in 4 rows and a spacing between electrodes of a pair forming a light modulation region in the inner side of the 4 rows is narrower than in the outer side thereof.

9. A light shutter apparatus according to claim 1 further comprising:
a shielding layer having a window
for each light modulation region, said window is defined as an aperture through which a light is transmitted.

10. A light shutter apparatus according to claim 9, wherein a dimension in one direction of each window of the shielding layer is set based upon the smallest spacing between the electrodes in pair.

11. A light shutter apparatus comprising:
a substrate having an electro-optical effect, and
a plurality of pairs of electrodes in an provided on the substrate, portions of the substrate between the respective pairs of electrodes functioning as light shutter elements,
wherein at least either of a spacing between electrodes in each pair and a shape of at least one electrode in each pair is different according to characteristics in an arrangement of the light shutter elements on the substrate.

12. A light shutter apparatus according to claim 11 further comprising:
a shielding layer having a window, said window is defined as an aperture through which a light is transmitted.

13. A light shutter apparatus according to claim 12, wherein a dimension in one direction of each window of the shielding layer is set based upon the smallest spacing between the electrodes in pair.

14. A light shutter apparatus according to claim 11, wherein said characteristics in the arrangement of the light shutter elements on the substrate include a position of the light shutter element on the substrate and an electrode pattern around the light shutter element.

15. A light shutter apparatus according to claim 11, wherein a spacing between the electrodes in the light shutter element at an end of the substrate is wider than the spacing between the electrodes at the other locations on the substrate.

16. A light shutter apparatus according to claim 11, wherein an area of the electrode placed at an end of the substrate is smaller than the area of the electrode placed at the other locations on the substrate.

17. A light shutter apparatus comprising:
a substrate with an electro-optical effect;
a plurality of pairs of electrodes provided on the substrate, portions of the substrate between the respective pairs of electrodes functioning as light shutter elements when electric field act between the respective pairs of electrodes;
wherein at least either of a spacing between the electrodes in each pair or a shape of at least one electrode in each pair is set according to an acting strength of an electric field on each light shutter element.

18. A light shutter apparatus as claimed in claims 17, further comprising:
a shielding layer having a window for each light shutter element, said window is defined as an aperture through which a light is transmitted.

19. A light shutter apparatus according to claim 17, wherein a dimension in one direction of each window of the shielding layer is set based upon the light shutter element having the weakest action of an electric field.

20. A light shutter apparatus according to claim 17, wherein each pair of electrodes comprises a common electrode and an individual electrode, and a spacing between the common electrode and the individual electrode or a shape of at least one electrode in each pair is set according to an acting strength of an electric field on each light shutter element.

* * * * *